Patented Mar. 2, 1926.

1,574,748

UNITED STATES PATENT OFFICE.

JAMES BADDILEY AND WILLIAM WYNDHAM TATUM, OF MANCHESTER, ENGLAND, ASSIGNORS TO BRITISH DYESTUFFS CORPORATION LIMITED, OF MANCHESTER, ENGLAND.

DYESTUFF OF THE ANTHRAQUINONE SERIES AND PROCESS OF MAKING SAME.

No Drawing.    Application filed April 18, 1923. Serial No. 632,988.

*To all whom it may concern:*

Be it known that we, JAMES BADDILEY and WILLIAM WYNDHAM TATUM, subjects of the King of England, and residents of Manchester, in the county of Lancashire, England, have invented certain new and useful Improvements in Dyestuffs of the Anthraquinone Series and Processes of Making the Same, of which the following is a specification.

This invention relates to new dyestuffs of the anthraquinone series and processes of making the same which are obtained when amino derivatives of anthraquinone are condensed with a sulphochloro derivative of salicylic acid,

which may be here called the sulpho chloride or salicylic acid or salicylic sulpho chloride. They have most probably the general formula:

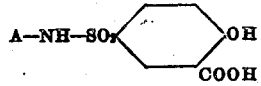

in which "A" represents an anthraquinone residue, which may be suitably substituted linked by .NH. to the sulpho chloride residue. The new dyestuffs possess in general acidic properties and dye wool directly in bright even shades of remarkable fastness to milling and washing. The dyes in addition possess mordant properties and may be applied according to the methods generally in use in this branch, i. e., they may be dyed on a chorme mordant or may be afterchromed or may be dyed by the metachrome process. The chromed shades are extraordinarily fast to milling and potting and possess the great advantage that they are not greatly different in hue from the unchromed shades. The new dyes may also be used in calico printing being applied to the fibre with a mordant e. g., chromium acetate, according to the conventional methods in this art, and in dyeing acetyl silk; that is, silk made from acetyl cellulose or cellulose acetate, as it is sometimes called.

The following examples will serve to illustrate further the nature of the invention, but the invention is not confined to the examples:

*Example 1.*

A mixture consisting of 10 parts of diamino anthrarufin, 10 parts of salicylic sulpho chloride, 3½ parts of anhydrous sodium acetate and 72 parts of nitrobenzene is heated at 100° C. until no further reaction takes place. The nitrobenzene is then removed by steam distilling the mixture in the presence of a slight excess of sodium carbonate. The residue is an aqueous solution of the new dyestuff in the form of its sodium salt. The colour may be isolated in a state of purity by filtering the solution from any alkali-insoluble products and precipitating it in the form of free acid by the use of hydrochloric acid. It may be converted to its sodium salt in the usual way. The sodium salt is easily soluble in water and dyes wool from an acid dyebath in reddish blue shades which are remarkably fast to alkaline milling. One afterchroming the shade becomes greener in hue and is fast to milling and potting. When printed on calico with chromium acetate blue shades fast to soaping are produced. Acetyl silk is dyed a blue shade.

*Example 2.*

10 parts of 1.4 diaminoanthraquinone are condensed with 11 parts of salicylic sulpho chloride in 72 parts of nitrobenzene at 60–90° C. When the reaction is complete the new dyestuff is mainly out of solution. It is filtered off, freed from nitrobenzene by steaming and worked up as before. The new dyestuff forms an easily soluble sodium salt and dyes level shades of bluish-red in the acid dyebath. The direct dyeings withstand alkaline milling. On afterchroming they are almost unchanged in hue but become rather faster to alkine milling and fast to potting. When printed on cotton with chromium acetate in the usual way bluish-red prints are obtained which are fast to soaping. Acetyl silk is dyed a bluish-red of extraordinarily fine shade and fastness.

*Example 3.*

*Dyestuff from 1:4:5:8-tetra-amino anthraquinone and salicylic sulpho chloride.—* 27 parts tetra-amino anthraquinone, 25 parts salicylic sulpho chloride, 17 parts sodium acetate (fused), 1.2 parts copper bronze and 210 parts nitrobenzene. The above charge is stirred at a temperature of 135° C. for 3 hours. The condensation product which crystallizes out on cooling, is filtered off, and purified by distillation with steam. The adhering nitrobenzene is thereby removed and the sodium salt of the dyestuff goes into solution with a beautiful blue colour. The solution is filtered from any insoluble matter and precipitated by addition of salt. The new dyestuff dyes wool in bright blue shades having very good fastness properties. It also has a good affinity for acetyl silk dyeing the fibre in fast blue shades.

Now what we claim is—

1. The new dyestuffs of the anthraquinone series of the general formula:—

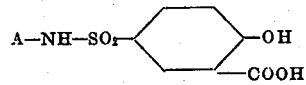

in which "A" represents an anthraquinone residue, which can be suitably substituted, which are acid dyestuffs dyeing wool directly and also dye on a chrome mordant and possess considerable affinity for acetyl silk.

2. As a new dyestuff, a reaction product of salicylic sulpho chloride with 1.4 diamino anthraquinone, said dyestuff having the general formula:—

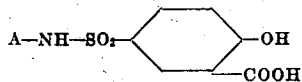

in which "A" represents a 1.4 diamino anthraquinone residue, said dyestuff being an acidic dyestuff, which in the form of its sodium salt is soluble in water, dyes wool from the acid bath giving bluish-red shades, which is almost unchanged in shade on after-chroming and which dyes acetyl silk a bluish-red shade.

3. The process of manufacturing new dyestuffs of the anthraquinone series which comprises condensing an amino derivative of anthraquinone with the sulpho chloride of salicylic acid.

In testimony whereof, we have hereunto affixed our signatures.

JAMES BADDILEY.
WILLIAM WYNDHAM TATUM.